United States Patent [19]
Jansen

[11] 3,915,470
[45] Oct. 28, 1975

[54] DROP AXLE SUSPENSION SYSTEM
[75] Inventor: Ronald R. Jansen, Sully, Iowa
[73] Assignee: John Zegers, Sully, Iowa ; a part interest
[22] Filed: Nov. 23, 1973
[21] Appl. No.: 418,748

[52] U.S. Cl. .................... 280/104.5 R; 180/24.02
[51] Int. Cl.² ............................................ B60G 5/02
[58] Field of Search ....... 280/124 R, 104.5 R, 81 R, 280/106 T; 180/22 D, 22 E, 24.02; 248/361 A

[56] References Cited
UNITED STATES PATENTS

| | | | |
|---|---|---|---|
| 2,698,759 | 1/1955 | Ronning | 280/81 R |
| 3,178,201 | 4/1965 | Richnow | 180/24.02 |
| 3,363,913 | 1/1968 | McFarland | 180/22 D |
| 3,659,671 | 5/1972 | Heinze | 180/24.02 |
| 3,751,064 | 8/1973 | Goodson | 280/106 T |
| 3,762,487 | 10/1973 | Bilas | 280/104.5 R |
| 3,771,812 | 11/1973 | Pierce | 280/124 F |

Primary Examiner—Philip Goodman
Assistant Examiner—John A. Carroll
Attorney, Agent, or Firm—Zarley, McKee, Thomte & Vorhees

[57] ABSTRACT

A drop axle suspension system includes a frame having outwardly facing side channel members received in the inwardly facing side channel members of the truck frame. A pivot shaft extends transversely between oppositely disposed links having lower ends engaging the free end of a leaf spring. A connecting link extends forwardly and is pivotally connected to a second pivotal link having a downwardly extending chain connected to a hanger engaging the axle associated with the springs. A hydraulic cylinder extends from the forward transverse frame member to the transversely extending shaft; and upon the cylinder being extended, the first and second pivotal links are pivoted upwardly, thereby allowing the axle to be raised by the second link. When the power cylinder is contracted, the lower end of the first link limits upward movement of the springs until the first link is pivoted past an over center position, and then upward pivotal movement is limited by a stop element engaging the first link, thereby relieving the fluid cylinder from any load-carrying forces. The hangers are loose, but limit downward travel of the axle beyond a predetermined point.

11 Claims, 7 Drawing Figures

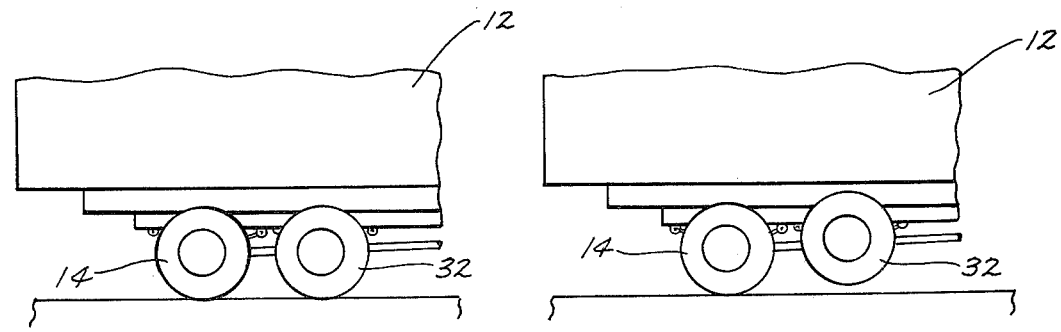
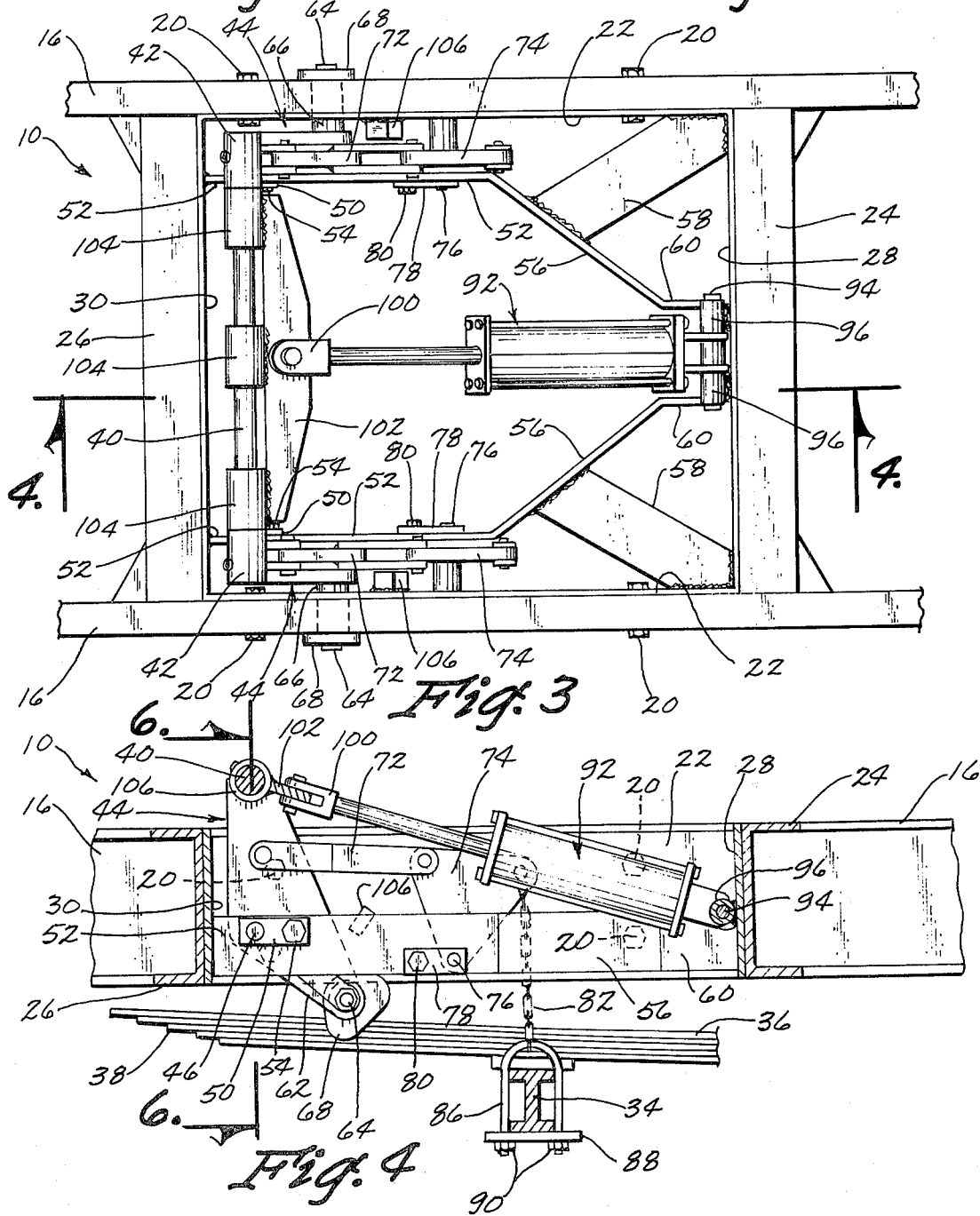

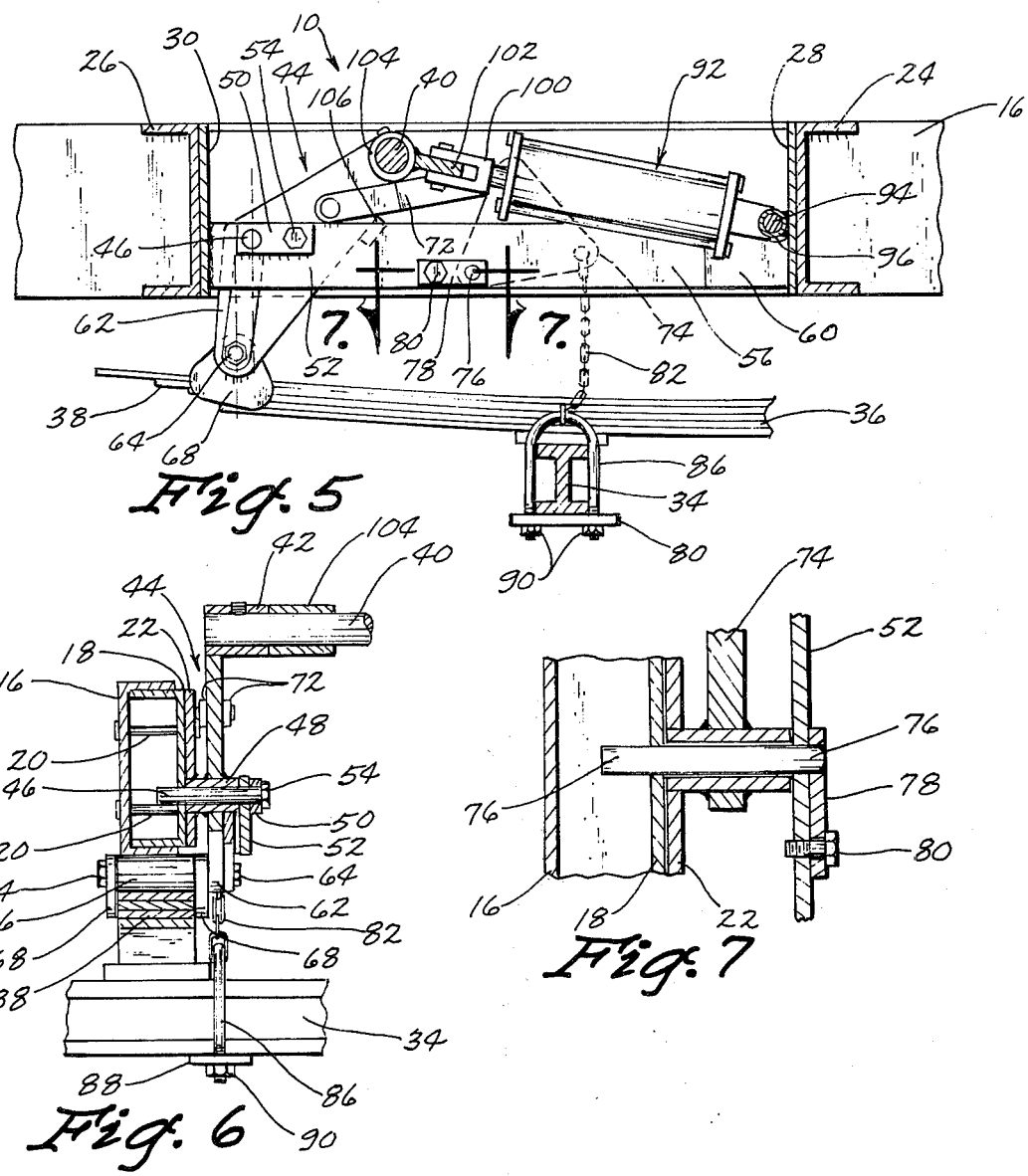

DROP AXLE SUSPENSION SYSTEM

It is common in the transport industry to carry a substantial load to a given destination and then return empty. Sufficient load-carrying axles and related wheels for the truck while the truck is loaded are unnecessary when the truck is being operated empty. The drop axle suspension system of this invention allows a single-axle truck to be converted to a double-axle truck by the bolting in place of the drop axle suspension system. A single power cylinder will raise and lower the auxilliary axle, and when the axle is lowered, the load transmitted to the vehicle frame is carried by the frame directly rather than through the power cylinder. The power cylinder is essentially used only for raising the axle and its oppositely disposed springs which are permanently pivoted to the vehicle frame at one end only. The opposite ends of the springs are connected to the vehicle's axle through the lower ends of pivotal links carried on the drop axle suspension system. The second pivotal links include downwardly-extending chain elements having hangers on their lower ends engaging the auxilliary axle and function to limit the downward travel of the axle should the wheels hit a substantial depression, and also to raise the axle when the drop axle is not to be used.

This invention consists in the construction arrangements and combination of the various parts of the device, whereby the objects contemplated are attained as hereinafter more fully set forth, specifically pointed out in the claims, and illustrated in the accompanying drawings in which:

FIGS. 1 and 2 are side elevation views of a truck having the drop axle suspension system of this invention, wherein FIG. 1 shows the drop axle down and the associated wheels engaging the ground, while FIG. 2 shows the drop axle in its raised position, with the wheels above the ground.

FIG. 3 is a top plan view of the drop axle suspension system.

FIG. 4 is a cross sectional view taken along Line 4 — 4 in FIG. 3.

FIG. 5 is a view similar to FIG. 4, but showing the suspension system in its down position.

FIG. 6 is a cross sectional view taken along Line 6 — 6 in FIG. 4.

FIG. 7 is a cross sectional view taken along Line 7 — 7 in FIG. 5.

The drop axle suspension system of this invention is referred to generally in FIG. 3 by the reference numeral 10 and is mounted on a truck 12 having standard rear wheels 14. The truck 12 includes a pair of longitudinally extending, inwardly facing side channel members 16, to which outwardly facing channel frame members 18 (FIG. 6) are secured by bolts 20 extending through the suspension system side frame members 22. The truck frame further includes transversely extending front and rear channel members 24 and 26 oppositely facing. The suspension system frame likewise includes forwardly and rearwardly transversely extending frame members 28 and 30, such that these members, in cooperation with the side frame members 22, form an integral frame for the suspension system.

An auxilliary set of wheels 32 is provided on axle 34, forwardly of the wheels 14, and are provided with longitudinally extending leaf springs 36 at its opposite ends. The forward ends of the leaf springs are secured in a conventional side frame 16 of the truck, as seen in FIGS. 1 and 2. The rear ends 38 of the springs are supported by the suspension system 10 as hereinafter described.

A transversely extending shaft 40 is received in oppositely disposed sleeves 42 carried on the upper ends of link members 44 pivotal about an axis through a pin 46 extending through a bearing sleeve 48, rigidly secured to the side frame 22 and thence into the channel frame 18, as seen in FIG. 6. A pin 46 is held in place by a rigid plate element 50 secured to an inner longitudinally extending frame plate 52 by a bolt 54. The inner plate frame 52 has forwardly and inwardly extending portions 56 braced to the side and end frame portions 22 and 28 by braces 58. The plate elements 56 then terminate in forwardly extending end portions 60, welded to the forward frame portion 28.

The link 44 includes a downwardly extending portion 62 having a bolt 64 on which a roller 66 is provided for engaging the top surface of the rear free end of the spring 38. A pair of downwardly extending side guide plates 68 is provided for embracing the spring 38 to maintain the roller 66 in engagement with the spring 38.

A pair of connecting links 72 connect to the upper end of the link 44 and extend forwardly into pivotal connection with a second pivotal link 74, pivotal about an axis through a pin 76, secured to the inner side frame plate 52 by a retainer plate 78 bolted to the plate 52 by the bolt 80. The second pivotal link 74 is triangular in shape and pivots at one corner with the connecting link 72 being connected at another corner, and a hanger chain 82 is pivotally connected at the third corner and hangs downwardly with a downwardly facing U-shaped hanger 86 being provided at the lower end of the chain 82. The hanger 86 extends over the auxilliary axle 34 and is bolted thereto by a plate 88 held in place by nuts 90.

A fluid power cylinder 92 is provided for operating the drop axle suspension system and has its forward end connected through a pin 94 to a pair of sleeves 96, in turn welded to the forward transverse plate frame 28. The sleeves 96 are positioned on the top of the inner frame portions 56. The rear end of the power cylinder 92 includes a clevis 100 connected to a tongue plate 102 rigidly secured to a trio of sleeves 104 carried on the transversely extending shaft 40.

The function of the power cylinder is primarily to raise the wheels 32, axle 34 and leaf springs 36, rather than to transfer forces from the road to the truck frame 16. These forces instead are transferred directly to the truck frame through the link 44, which, when in its down position of FIG. 5, engages a stop element 106 welded between the outer side of frame member 22 and the inner side frame member 52. Thus, upon the link 44 moving past an over-center position while moving from the position of FIG. 4 to the position of FIG. 5, the link is limited against further movement by the stop element 106, thereby relieving the power cylinder 92 from carrying the load of the auxilliary wheels 32. It is further seen that in FIG. 5 the hanger chain 82 is loose but further functions to limit the downward travel of the axle 34 and springs 38 should the wheels 32 fall into a substantial depression. This is necessary since the link 44 is not locked to the rear end of the springs 38.

Thus, it is seen in operation that the drop axle suspension system 10 of this invention may be readily assembled within the frame members 22, 26 and 28 and then installed on existing trucks having inwardly facing channel frame members 16. The use of the supplemental outwardly facing channel members 18 substantially strengthen the connection of the side frame members 22 to the truck frame channel members 16. The forward ends of the springs 38 are connected to the truck frame 16 in a conventional manner, and the hanger brackets 86 are connected to the axle 34 at its opposite ends, while the guide plates 68 are positioned on opposite sides of the spring 38, while the roller 66 engages the top spring of the spring assembly 38. The power cylinder is then hooked to the hydraulic or air system of the truck and is ready to operate. When a load is being carried, a power cylinder is contracted to the position of FIG. 5, causing the link 44 to pivot its lower end downwardly, allowing the link 74 to pivot downwardly, causing the hanger chain 82 to in turn move downwardly with the spring 36 and the axle 34. The wheels are now engaging the ground, as seen in FIG. 1, and forces from the ground will be transmitted upwardly through the roller 66 to the link 44, which in turn now engages the stop element 106, thereby transferring the ground forces to the truck frame 16 and bypassing the power cylinder 92. When the load in the truck has been removed and the auxilliary wheels 32 are no longer needed, the power cylinder is extended, as seen in FIG. 4, and the wheels 32 are raised, as seen in FIG. 2. The link 44 is pivoted upwardly, allowing the spring 36 to be raised by the hanger 86 on the hanger chain 82 connected to the forward second link 74. The truck can be driven in this position for an indefinite period of time or until another load is to be transported.

I claim:

1. A drop axle suspension system comprising,
   a frame adapted to be secured to a vehicle frame,
   a linkage assembly on said frame having a link adapted to be pivoted between raised and lowered positions and in said lowered position being against one end of a leaf spring assembly and a hanger directly engaging an axle for moving said axle to a raised position,
   said link engaging a stop when pivoted to said lowered position and said spring means engaging said link to pivot it against said stop when an upward force is applied to said axle,
   a power means connected to said linkage assembly for pivoting said link into engagement with said one end of said leaf springs while moving said hanger to said lowered position and upon said link being pivoted to said lowered position upward movement of said one end of said spring is limited and said axle is free to move vertically, and when said linkage assembly is pivoted upwardly said link moves upwardly as said hanger moves upwardly for lifting an axle.

2. The structure of claim 1 wherein said hanger is connected to said linkage assembly by a flexible element.

3. The structure of claim 1 wherein said power means is a fluid cylinder.

4. The structure of claim 1 wherein said linkage assembly includes a second link pivotally connected to said frame and said hanger is connected to said second link and a connecting link interconnects said first and second links such that they may operate together.

5. The structure of claim 1 wherein said link includes at its lower end a pair of spaced apart, downwardly extending guide elements adapted to straddle said spring.

6. The structure of claim 1 wherein said linkage assembly includes a link at opposite sides for engagement with oppositely disposed springs on a vehicle and a hanger at opposite sides for engagement with opposite ends of an axle.

7. The structure of claim 1 wherein said pivotal link moves through and over center position in moving between up and down positions.

8. In combination, a vehicle having a frame and a pair of ground engaging wheels, and a drop axle suspension system comprising,
   a frame secured to said vehicle frame over oppositely disposed longitudinally extending leaf springs interconnected by an axle,
   a linkage assembly on said frame having a pivotal link engaging the top of one end of each of said leaf springs for limiting said one end against upward movement when said link is in a down position,
   said linkage assembly including a hanger at each end of said axle for directly engaging and raising said axle,
   said link engaging a stop when pivoted to said down position and said spring means engaging said link to pivot it against said stop when an upward force is applied to said axle,
   a power means connected to said linkage assembly for raising said links to allow said one end of each of said springs to move upwardly while said hangers are raising said axle; and for lowering said links against the upward force of said leaf springs while said hangers move downwardly, allowing said axle to be lowered.

9. In combination, a vehicle having a frame and a pair of ground engaging wheels, and a drop axle suspension system comprising,
   a frame secured to said vehicle frame over oppositely disposed longitudinally extending leaf springs interconnected by an axle, a linkage assembly on said frame having a pivotal link engaging the top of one end of each of said leaf springs for limiting said one end against upward movement when said link is in a down position,
   said linkage assembly including a hanger at each end of said axle for directly engaging and raising said axle,
   each of said pivotal links being pivotally connected to a second pivotal link by a connecting link, and said hangers being connected to said second pivotal links by downwardly extending connecting links,
   a power means connected to said linkage assembly for raising said links to allow said one end of each of said springs to move upwardly while said hangers are raising said axle; and for lowering said links against the upward force of said leaf springs while said hangers move downwardly, allowing said axle to be lowered.

10. The structure of claim 9 wherein said power means is further defined as a fluid cylinder having one end connected to said linkage assembly and the other end connected to said frame, and a stop is provided to limit pivotal movement of said linkage assembly in response to the upward forces of said springs, thereby relieving the pressure on said fluid cylinder.

11. In combination, a vehicle having a frame and a pair of ground engaging wheels, and a drop axle suspension system comprising,
- a frame secured to said vehicle frame over oppositely disposed longitudinally extending leaf springs interconnected by an axle,
- a linkage assembly on said frame having a pivotal link engaging the top of one end of each of said leaf springs for limiting said one end against upward movement when said link is in a down position,
- said linkage assembly including a hanger at each end of said axle for directly engaging and raising said axle,
- a power means connected to said linkage assembly for raising said links to allow said one end of each of said springs to move upwardly while said hangers are raising said axle; and for lowering said links against the upward force of said leaf springs while said hangers move downwardly, allowing said axle to be lowered, and said vehicle frame including longitudinally extending spaced apart inwardly facing channel shaped frame members and said frame includes complementary shaped outwardly facing channel members nested in said vehicle frame side frame members and bolt means connecting said vehicle frame members to said frame members.

* * * * *